Jan. 6, 1953     R. E. BAUMHECKEL     2,624,643
BEARING
Filed Nov. 15, 1951     2 SHEETS—SHEET 1
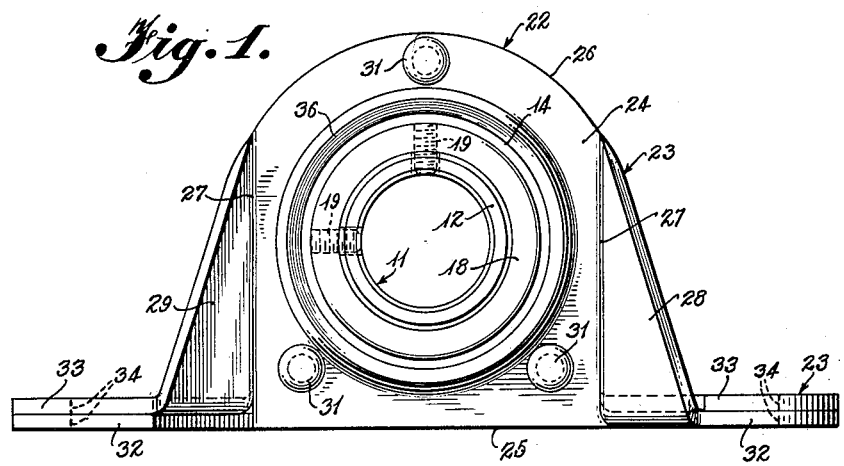
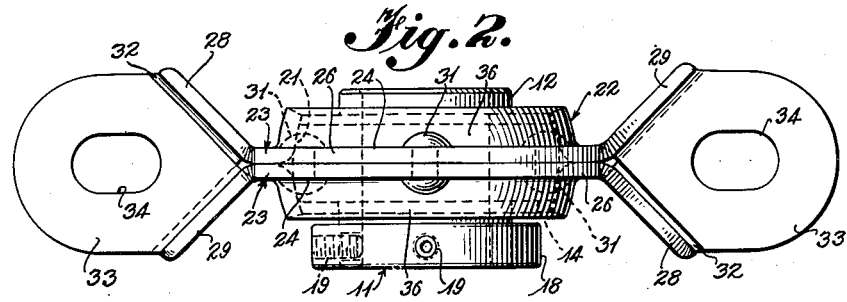
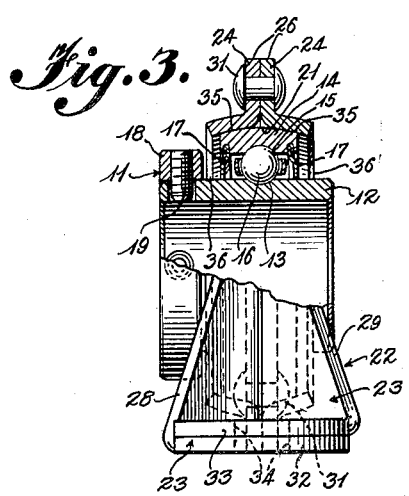
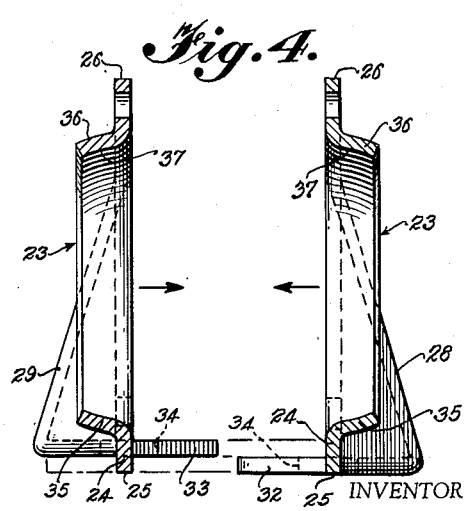
INVENTOR
*Ralph E. Baumheckel*
BY *L. Donald Meyers*
ATTORNEY Jan. 6, 1953 R. E. BAUMHECKEL 2,624,643
BEARING
Filed Nov. 15, 1951 2 SHEETS—SHEET 2
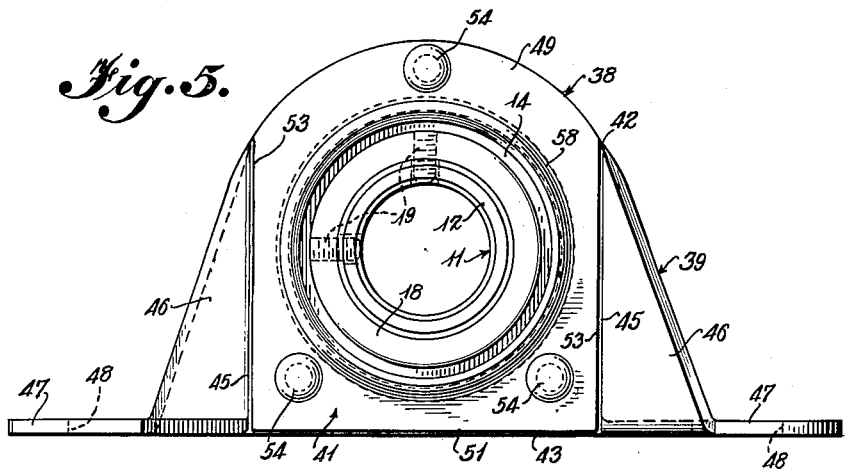
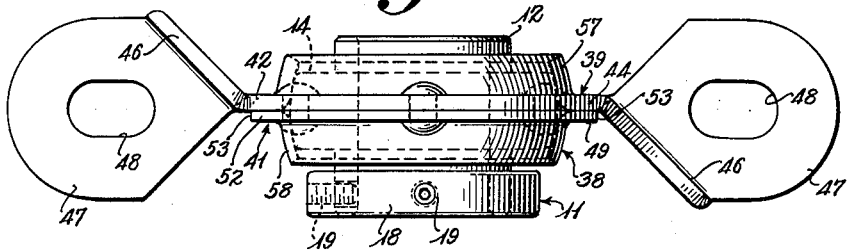
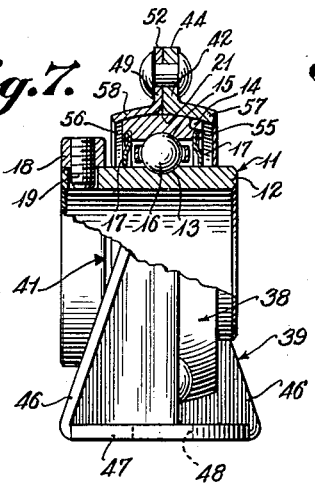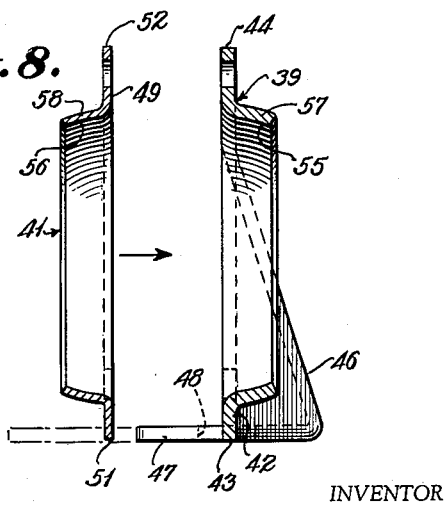
INVENTOR
*Ralph E. Baumheckel*
BY L. Donald Myers
ATTORNEY Patented Jan. 6, 1953

2,624,643

UNITED STATES PATENT OFFICE 2,624,643

BEARING

Ralph E. Baumheckel, Connersville, Ind., assignor to Link-Belt Company, a corporation of Illinois Application November 15, 1951, Serial No. 256,472

10 Claims. (Cl. 308—194)

This invention relates to new and useful improvements in pillow block bearings and deals more specifically with housings for such bearings which are formed of pressed steel parts.

The most widely used pillow block bearing housings in the past have been formed from castings which have required certain surfaces to be machined. The required machining operations were time consuming and costly but the resulting product was accurately dimensioned and of heavy, sturdy construction. For installations of the type where the bearing loads are light, it has been considered that the weight and cost of cast housings are excessive. It has been proposed, therefore, that pillow block housings for bearings supporting relatively light loads be formed of pressed steel parts by means of simple punching, bending and deep drawing or other relatively fast and inexpensive operations.

The types of sheet metal pillow block housings that have been developed heretofore have not been completely successful for several reasons among which are insufficient rigidity for satisfactory operation and the difficulty of maintaining the necessary tolerances in parts formed by deep drawing because of the tendency of the metal to spring back into its original position which increases as the depth of the draw increases and the diameter of the drawn portion decreases.

The primary object of this invention is to provide a pillow block bearing employing a housing formed of pressed steel parts which are so dimensioned and shaped as to prevent deflection or distortion of the housing.

A further important object of the invention is to provide a pillow block bearing housing that is constructed of pressed steel parts which require no machining.

A still further object of the invention is to provide a pillow block bearing housing that is constructed of pressed steel parts which are formed to provide a rigid structure that is effectively braced against axial deflection or distortion.

Another object of the invention is to provide a pillow block bearing housing that is formed of pressed steel parts each of which is subjected to a deep drawing operation in which the depth of the draw is sufficiently shallow relative to its diameter as to permit the dimensions of the deep drawn portion to be easily and accurately established and maintained.

Other objects and advantages of the invention will be apparent during the course of the following description.

In the accompanying drawings forming a part of this specification and in which like reference characters are employed to designate like parts throughout the same, Figure 1 is a side elevational view of a pillow block bearing embodying the invention, Figure 2 is a top plan view of the pillow block bearing illustrated in Fig. 1, Figure 3 is an end elevational view, partly broken away, of the pillow block bearing illustrated in Fig. 1, Figure 4 is an exploded, vertical sectional view of the principal housing parts positioned for assembly and illustrating the overlying relationship of the cooperating mounting pads, Figure 5 is a side elevational view of a modified form of pillow block bearing embodying the invention, Figure 6 is a top plan view of the pillow block bearing illustrated in Fig. 5, Figure 7 is an end elevational view, partly broken away, of the pillow block bearing illustrated in Fig. 5, and Figure 8 is an exploded, vertical sectional view of the principal housing parts illustrated in Figs. 5 to 7, inclusive, positioned for assembly.

In the drawings, wherein for the purpose of illustration are shown the preferred embodiments of this invention, and first particularly referring to Figs. 1 to 4, inclusive, there is shown a pillow block bearing that includes a standard, self-alining anti-friction bearing unit 11 which includes an inner ring 12 having a ball groove 13, an outer ring 14 having a ball groove 15, and balls 16 positioned in the said grooves. A pair of seals 17, of any desired design, are operatively associated with the rings 12 and 14 on opposite sides of the balls 16. Mounted on one end portion of the inner ring 12 is a retaining collar 18 provided with set screws 19 for rigidly connecting the inner ring to a shaft, not shown. The periphery 21 of the outer race ring 14 is arcuate in cross-section to provide a parti-spherical outer surface for the bearing unit 11.

The bearing unit 11 is mounted in a housing 22 which is formed of a pair of identical, one-piece pressed steel members 23, each of which is formed with a flat body portion 24 having a straight bottom edge 25 and an arcuate top edge 26. The opposite side edges 27 of the flat body portion 24 are normal to the bottom edge 25 and are defined by the line of intersection of the flat, triangular bracing webs 28 and 29 and the flat body portion. The body portions 24 of the two members 23 are arranged in back-to-back relationship with full face contact therebetween and are rigidly connected by rivets 31, or by any other suitable means, such as welding.

The triangular bracing webs 28 and 29 extend diagonally outwardly and forwardly or to the front of the side edges 27 of each body portion 24 with an included angle between the webs and body portion preferably of approximately 135°. Extending outwardly, in opposite directions, and rearwardly, or to the back, of the bottom edges of the bracing webs 28 and 29 are the mounting pads 32 and 33, respectively, which are normal to their bracing webs and to the body portions 24. The bottom surface of the mounting pad 32 for each of the members 23 lies in the plane of the bottom edge 25 of its body portion 24. The bottom surface of the mounting pad 33 for each of the members 23 lies in a plane that is elevated above the bottom edge 25 of its body portion 24 a distance that is equal to the thickness of the metal stock from which the members 23 are produced. The mounting pads 33, therefore, will overlie the mounting pads 32, in surface contact therewith, when the two members 23 are assembled to form a housing. Alined apertures 34 are formed in the overlying mounting pads 32 and 33 for receiving bolts, or similar fastening devices, not shown. It will be noted in Fig. 2 that the space between the adjacent bracing webs 28 and 29 on each side of the housing 22 affords easy access to the apertures 34 for manipulating the selected fastening devices. It also will be noted that the diagonal arrangement of the bracing webs 28 and 29 will afford maximum stiffening or rigidity for the housing in both axial and lateral directions.

Centrally located in each body portion 24 is a peripherally flanged opening 35, the flange 36 of which is arcuate in cross-section and is formed by a deep drawing operation. Since the width of each flange 36 is narrow relative to the diameter of the drawn area, the dimensions of the flange can be held to close tolerances because there will be very little, if any, tendency for the metal to spring back to its original position. When the body portions 24 are connected by the rivets 31, or by welding if desired, the openings 35 are aligned and the inner arcuate surfaces 37 of the flanges 36 will combine to form a parti-spherical bearing seating surface. Since the outer surface 21 of the bearing unit 11 engages the surfaces 37 of the flanges 36 and is also parti-spherical in form, it readily will be apparent that the axis of the bearing unit may be angularly displaced within permissible limits.

Referring now to Figs. 5 to 8, inclusive, for a detail description of the modification of the invention illustrated therein, the pillow block bearing incorporates an anti-friction bearing unit 11 identical to the one illustrated in Figs. 1 to 3, inclusive, and the same reference characters have been used to designate the several like parts.

The bearing unit 11 is mounted in a housing 38 formed of a pair of one-piece, pressed steel members 39 and 41. As illustrated in Figs. 6 to 8, inclusive, the member 41 is formed of a thinner stock than the member 39. It is to be understood, however, that this construction is not essential and the invention should not be limited in this respect.

The housing member 39 is formed with a flat body portion 42 having a straight bottom edge 43 and an arcuate top edge 44. The opposite side edges 45 of the flat body portion 42 are normal to the bottom edge 43 and are defined by the line of intersection of the flat, triangular bracing webs 46 and the flat body portion.

The triangular bracing webs 46 extend diagonally outwardly in opposite directions from the edges 45 of the body portion 42 with the included angle between one web and the back face of the body portion and the included angle between the other web and the front face of the body portion preferably being approximately 135°. Extending outwardly from the bottom edge of each bracing web 46 is a mounting pad 47 which is normal to the bracing web and to the body portion 42. The bottom surface of each mounting pad 47 lies in the plane of the bottom edge 43 of the body portion 42. Apertures 48 are formed in the mounting pads 47 for receiving bolts, or other similar fastening devices, not shown. It will be noted that the diagonal arrangement of the bracing webs 46 will afford maximum stiffening or rigidity for the housing in both axial and lateral directions.

The housing member 41, also, is formed with a flat body portion 49 having a straight bottom edge 51 and an arcuate top edge 52. The opposite side edges or margins 53 of the body portion 49 are normal to the bottom edge 51. No bracing webs are provided for the housing member 41.

The body portions 49 and 42 of the housing members 41 and 39, respectively, are arranged in back-to-back relationship with full face contact therebetween and with their arcuate top edges 52 and 42 alined. Rivets 54, or any other suitable connecting means, such as welding, may be employed to rigidly connect the body portions 49 and 42 in the above described position. As illustrated in Fig. 5, the side and bottom edges 53 and 51 of the body portion 49 are inwardly spaced a slight distance from the corresponding edges of the body portion 42.

Centrally located in the body portions 42 and 49 are peripherally flanged openings 55 and 56, respectively. The flanges 57 and 58 of the openings are arcuate in cross-section and are formed by deep drawing operations. The width of each of the flanges 57 and 58 is narrow relative to the diameter of the drawn area so that the flanges can be held to close tolerances because there will be very little, if any, tendency for the metal to spring back to its original position. When the body portions 42 and 49 are connected by the rivets 54, or by welding if desired, the openings 55 and 56 are alined and the inner arcuate surfaces of the flanges 57 and 58 will combine to form a parti-spherical bearing seating surface. Since the outer surface 21 of the bearing unit 11 engages the parti-spherical seating surface formed by the flanges 57 and 58 and is also parti-spherical in form, it readily will be apparent that the axis of the bearing unit may be angularly displaced within permissible limits.

It is to be understood that the forms of this invention herewith shown and described are to be taken as preferred examples of the same, and the various changes in the shape, size, and arrangement of parts may be resorted to without departing from the spirit of the invention or the scope of the subjoined claims.

Having thus described the invention, I claim:

1. A pillow block bearing, comprising a housing formed of a pair of rigidly connected, one-piece pressed steel members, one of said members having a flat body portion, a pair of mounting pads, and a pair of bracing webs extending diagonally outwardly from the opposite edges of the flat body portion to the mounting pads, the other of said members having a flat body portion in face contact with the body portion of the first mentioned member, said flat body portions having peripherally flanged, alined openings collectively forming an annular bearing seat, and a bearing unit mounted in said seat.

2. A pillow block bearing, comprising a housing formed of a pair of rigidly connected, one-piece pressed steel members, one of said members having a flat body portion, a pair of mounting pads spaced from opposite edges of said body portion, and a pair of bracing webs extending diagonally outwardly from the opposite edges of the flat body portion to the mounting pads, the other of said members having a flat body portion in face contact with the body portion of said first mentioned member, said flat body portions having peripherally flanged, alined openings, said flanges being of arcuate cross-section and extending axially outwardly in opposite directions from the flat body portions to collectively provide an annular bearing seat, and an anti-friction bearing unit mounted in said seat.

3. A pillow block bearing, comprising a housing formed of a pair of rigidly connected, one-piece pressed steel members, one of said members having a flat body portion, a pair of triangular bracing webs extending diagonally outwardly from the opposite edges of the flat body portion, and a pair of mounting pads extending from the bottom edges of said bracing webs in normal relationship with the webs and the flat body portion, the other of said members having a flat body portion in face contact with the body portion of said first mentioned member, said body portions having peripherally flanged, alined openings, said flanges being of arcuate cross-section and extending axially outwardly in opposite directions from the flat body portions, the combined inner surfaces of said outwardly extending flanges forming a parti-spherical seating surface, and a bearing unit mounted with its outer surface engaging said seating surface.

4. A pillow block bearing, comprising a housing formed of a pair of rigidly connected, one piece pressed steel members, one of said members having a flat body portion formed with parallel side edges normal to its bottom edge and an arcuate top edge, a pair of triangular bracing webs extending diagonally outwardly from said side edges at an included angle of approximately 135 degrees with said body portion, and a pair of mounting pads extending from the bottom edges of said bracing webs in normal relationship with said webs and the body portion, the other of said members having a flat body portion formed with parallel side edges normal to its bottom edge and an arcuate top edge and arranged in face contact with the body portion of said first mentioned member, said body portions having peripherally flanged, centrally located openings in axial alinement, said flanges being of arcuate cross-section and extending axially outwardly in opposite directions from the flat body portions to collectively provide an annular bearing seat having a parti-spherical inner surface, and an anti-friction bearing unit mounted in said bearing seat and having a parti-spherical outer surface in engagement with the inner surface of the seat.

5. A pillow block bearing, comprising a housing formed of a pair of identical, rigidly connected one-piece pressed steel members, each of said members having a flat body portion, a pair of mounting pads, and a pair of bracing webs extending diagonally outwardly from the opposite edges of the flat body portion to the mounting pads, said flat body portions having peripherally flanged, alined openings collectively forming an annular bearing seat, and a bearing unit mounted in said bearing seat.

6. A pillow block bearing, comprising a housing formed of a pair of identical, rigidly connected one-piece pressed steel members, each of said members having a flat body portion, a pair of mounting pads, and a pair of bracing webs extending diagonally outwardly from the opposite edges of the flat body portion to the mounting pads, said flat body portions having peripherally flanged, alined openings, said flanges being of arcuate cross-section and extending axially outwardly in opposite directions from the flat body portions to collectively provide an annular bearing seat, and an anti-friction bearing unit mounted in said seat.

7. A pillow block bearing, comprising a housing formed of a pair of identical, rigidly connected, one-piece pressed steel members arranged in back-to-back relationship, each of said members having a flat body portion, a pair of bracing webs extending diagonally to the front and outwardly from the opposite edges of the body portion, and a pair of mounting pads extending from the bottom edges of said bracing webs in a backward direction normal to said body portion, said flat body portions having peripherally flanged alined openings collectively forming an annular bearing seat, and a bearing unit mounted in said seat.

8. A pillow block bearing, comprising a housing formed of a pair of identical rigidly connected one-piece pressed steel members arranged in back-to-back relationship, each of said members having a flat body portion, a pair of bracing webs extending diagonally to the front and outwardly from the opposite edges of the body portion, and a pair of mounting pads extending from the bottom edges of said bracing webs in a backward direction normal to said body portion, one mounting pad of each of said members being arranged in overlying relationship with a mounting pad of the other member, said body portions having peripherally flanged alined openings, said flanges being of arcuate cross-section and extending axially outwardly in opposite directions from the flat body portions to collectively provide an annular bearing seat having a parti-spherical inner surface, and an anti-friction bearing unit mounted in said bearing seat and having a parti-spherical outer surface in engagement with the inner surface of said seat.

9. A pillow block bearing, comprising a housing formed of a pair of rigidly connected, one-piece pressed steel members, one of said members having a flat body portion, a pair of mounting pads, and a pair of bracing webs extending diagonally outwardly from the opposite edges of the flat body portion to the mounting pads, the other of said members having a flat body portion in face contact with the body portion of the first mentioned member and having its marginal edges within the area of said face contact, said flat body portions having peripherally flanged, alined openings collectively forming an annular bearing seat, and a bearing unit mounted in said seat.

10. A pillow block bearing, comprising a housing formed of a pair of rigidly connected, one-piece pressed steel members, one of said members having a flat body portion, a pair of bracing webs extending diagonally outwardly in opposite directions from the opposite edges of the flat body portion, and a pair of mounting pads extending from the bottom edges of said bracing webs in opposite directions normal to said body portion, the other of said members having a flat body portion in face contact with the body portion of the first mentioned member and having its marginal edges within the area of said face contact, said flat body portions having peripherally flanged, alined openings collectively forming an annular bearing seat, and a bearing unit mounted in said seat.

RALPH E. BAUMHECKEL.

REFERENCES CITED

The following references are of record in the file of this patent:

UNITED STATES PATENTS

| Number | Name | Date |
|---|---|---|
| Re. 21,415 | Martinet | Apr. 2, 1940 |
| 1,711,119 | Lyman | Apr. 30, 1929 |
| 2,287,182 | Leake | June 23, 1942 |